Nov. 8, 1927.
B. H. LUNDBORG
1,648,773
FLUID FILTER
Filed Nov. 10, 1926
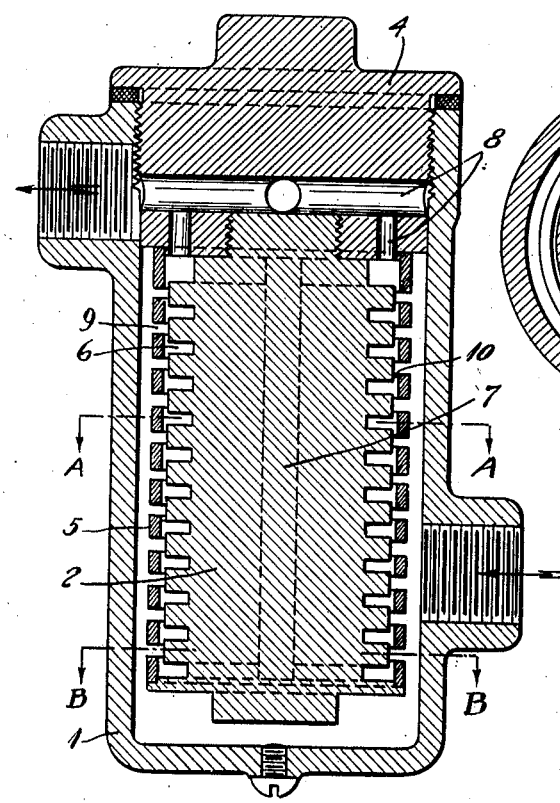
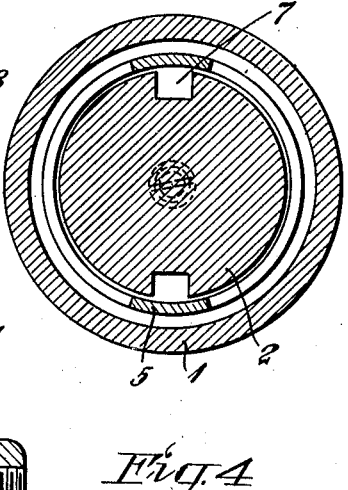
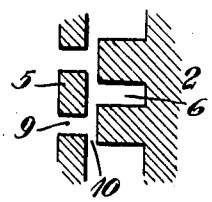
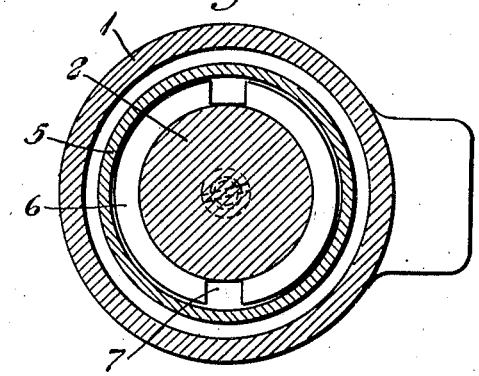
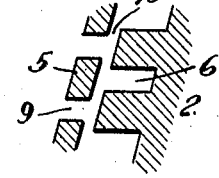
B. H. Lundborg
inventors
By: Marks & Clerk
Attys.

Patented Nov. 8, 1927.

1,648,773

UNITED STATES PATENT OFFICE.

BROR HENNING LUNDBORG, OF STOCKHOLM, SWEDEN. ASSIGNOR TO SVENSKA ACKUMULATOR AKTIEBOLAGET JUNGNER, A CORPORATION OF STOCKHOLM, SWEDEN.

FLUID FILTER.

REISSUED

Application filed November 10, 1926, Serial No. 147,588, and in Sweden June 19, 1926.

The filters generally used in filtering benzole, oils and the like consist of a wire-net having a certain fixed size of the meshes. The said filters are very soon stopped up, and since, in order that the filter shall be effective, the size of the meshes must be extremely small, it is very difficult to effectively clean the same, and the common consequence is that the net is destroyed in order to let the fluid pass, and thus the filtering action get lost. Besides, if the filter has once been provided with a filter net having a certain size of the meshes, it meets with a considerable trouble to exchange said net for another net more suitable for the new purpose.

The present invention comprises a filter, which can be easily cleaned by a simple dismounting and which can be made adjustable for differently fine filtering through a screw adjusting means.

According to the invention the filter consists of at least two bodies placed in a fluid conduit and having opposed parallel surfaces separated through a small space, said bodies being provided with mutually displaced channels communicating through said space, and the channels of the one body being connected to the inlet and those of the other body to the outlet for the fluid.

According to one form of embodiment the filter consists of a housing having inlet and outlet openings and of a central body inserted or screwed into said housing and having grooves at the surface, said grooves being covered by members so that one or more narrow and, if desired, adjustable spaces are formed between the two bodies, said space being so narrow that it is capable of precluding the particles not desired.

The annexed drawing illustrates a form of embodiment of the invention. Fig. 1 shows a longitudinal section, Fig. 2 shows a cross-section along the line B—B, and Fig. 3 shows a cross-section along the line A—A of Fig. 1. Figs. 4 and 5 show two different forms of embodiment of the space, the one having a cylindrical central body and the other a conical central body.

Inserted in the housing 1 is a central body 2 which may be conical or cylindrical and which is connected to the housing by means of the screw plug 4. Connected to the screw plug 4 is also a sleeve-shaped body 5. The central body 2 is provided with annular grooves 6 which open into two longitudinal slots 7 communicating with the outlet through bores 8 in the screw plug. The covering member 5 is in the present case provided with cut slots 9 except in front of the slots 7 in the central body which are entirely covered by said member.

If the central body 2 be made with a smaller outer diameter than the inner diameter of the member 5, there will be formed a certain space 10, Figs. 4 and 5, which permits the fluid of passing freely, but retains the solid dirt, the size of which exceeds the space 10.

If, as according to Fig. 5, the central body 2 be made conical and also the member 5 be made with the same conical shape and if the said bodies be made adjustable relatively to each other, the space 10 can be made larger or smaller, and thus it is obtained that one and the same filter can by a simple adjustment be used for different purposes.

The passing of the oil through the filter is the following:

The oil enters through the inlet in the direction of the arrow, passes through the space 10, formed due to the difference of the diameters of the central body 2 and the covering element 5, is collected in the annular channels 6, passes through the longitudinal channels 7 and up through the bores 8 to the outlet.

The form of embodiment above referred to is an example only and several other forms may be suggested.

What I claim is:—

1. A fluid filter having an inlet and an outlet for the fluid and comprising at least two concentrically disposed bodies fitting to each other at the ends by the aid of cylindrical guide surfaces and separated between the ends through a narrow space, said bodies being provided with mutually displaced channels communicating through said space, the channels of the one body being connected to the said inlet and those of the other body to the said outlet for the fluid.

2. A fluid filter comprising a housing having an inlet and an outlet for the fluid, a central body inserted in said housing and having grooves at the surface, and members covering said grooves in such a way as to form between them and said central body spaces sufficiently narrow for filtering away solid particles, the two outermost ones of said covering members fitting to the ends of said central body by the aid of cylindrical guide surfaces.

3. A fluid filter comprising a housing having an inlet and an outlet for the fluid, a central body inserted in said housing and having annular grooves at the surface, and annular members covering said annular grooves in such a way as to form between them and said central body spaces sufficiently narrow for filtering away solid particles, the two outermost ones of said annular members fitting to the ends of said central body by means of cylindrical guide surfaces.

4. A fluid filter comprising a housing having an inlet and an outlet for the fluid, a central body inserted in said housing and having annular grooves at the surface and also at least one longitudinal slot communicating with said annular grooves, and annular members covering said annular grooves in such a way as to form between them and said central body spaces sufficiently narrow for filtering away solid particles, the two outermost ones of said annular members fitting to the ends of said central body by means of cylindrical guide surfaces.

5. A fluid filter comprising a housing having an inlet and an outlet for the fluid, a central body inserted in said housing and having annular grooves at the surface and also at least one longitudinal slot communicating with said annular grooves, and annular members covering said annular grooves in such a way as to form between them and said central body spaces sufficiently narrow for filtering away solid particles, the two outermost ones of said annular members fitting to the ends of said central body by means of cylindrical guide surfaces, and said annular members being connected to each other by means of at least one longitudinal plate covering said longitudinal slot in the central body.

6. A fluid filter according to claim 2, characterized by the central body having grooves at the surface being conical and by the covering members having also the same conical shape, whereby a change of the size of the filtering channels is obtained by displacing the covering members relatively to the central body.

7. A fluid filter according to claim 5, characterized by the central body having grooves at the surface being conical and by the covering members having also the same conical shape, whereby a change of the size of the filtering channels is obtained by displacing the covering members relatively to the central body.

In testimony whereof I affix my signature.

BROR HENNING LUNDBORG.